(12) United States Patent
Martin et al.

(10) Patent No.: US 12,427,501 B2
(45) Date of Patent: Sep. 30, 2025

(54) MAGNETIC NANOPARTICLES FOR REMOVAL OF PARTICULATE WASTE

(71) Applicant: THE TEXAS A&M UNIVERSITY SYSTEM, College Station, TX (US)

(72) Inventors: Leisha Martin, College Station, TX (US); Wei Xu, College Station, TX (US)

(73) Assignee: THE TEXAS A&M UNIVERSITY SYSTEM, College Station, TX (US)

( * ) Notice: Subject to any disclaimer, the term of this patent is extended or adjusted under 35 U.S.C. 154(b) by 375 days.

(21) Appl. No.: 18/194,604

(22) Filed: Mar. 31, 2023

(65) Prior Publication Data

US 2024/0326013 A1    Oct. 3, 2024

(51) Int. Cl.
| | |
|---|---|
| *B01J 20/26* | (2006.01) |
| *B01J 20/02* | (2006.01) |
| *B01J 20/28* | (2006.01) |
| *B01J 20/32* | (2006.01) |
| *B03C 1/01* | (2006.01) |
| *B03C 1/28* | (2006.01) |
| *C02F 1/28* | (2023.01) |

(Continued)

(52) U.S. Cl.
CPC ......... *B01J 20/262* (2013.01); *B01J 20/0229* (2013.01); *B01J 20/28009* (2013.01); *B01J 20/3204* (2013.01); *B01J 20/3219* (2013.01); *B01J 20/3276* (2013.01); *B01J 20/3293* (2013.01); *B03C 1/01* (2013.01); *B03C 1/28* (2013.01); *C02F 1/285* (2013.01); *C02F 1/288* (2013.01); *C02F 1/488* (2013.01); *B03C 2201/18* (2013.01); *C02F 2103/08* (2013.01); *C02F 2305/08* (2013.01)

(58) Field of Classification Search
CPC .......................... B01J 20/0229; B01J 20/262; B01J 20/28007; B01J 20/28009; B01J 20/3204; B01J 20/3219; B01J 20/3276; B01J 20/3293; B03C 1/01; B03C 1/28; B03C 2201/18; C02F 1/285; C02F 1/288; C02F 1/488; C02F 2103/08; C02F 2305/08

See application file for complete search history.

(56) References Cited

U.S. PATENT DOCUMENTS

| | | | | |
|---|---|---|---|---|
| 2005/0266394 A1* | 12/2005 | Hatton | .................. | C12M 47/02 436/526 |
| 2009/0053512 A1* | 2/2009 | Pyun | ..................... | G11B 5/712 252/62.51 R |

(Continued)

*Primary Examiner* — Dirk R Bass
(74) *Attorney, Agent, or Firm* — Womble Bond Dickinson (US) LLP

(57) ABSTRACT

Coated magnetic nanoparticles and methods for attracting, isolating, and/or removing of particulate waste from environments are provided. A coated magnetic nanoparticle may include an iron-containing core surrounded by a hydrophobic or amphiphilic coating. This coating can include a functional group based on PDMS such as C-PDMS, PDMS-co-APMS, and/or PDMS-OH block copolymers. The magnetic nanoparticles may be synthesized in air or air-free in an inert gas. The magnetic nanoparticles may be introduced into, for example, an aqueous environment to bind with waste contained therein through an adsorption process. The magnetic nanoparticles and bound waste may be attracted and removed from the environment by introducing an external magnetic field.

3 Claims, 10 Drawing Sheets

(51) Int. Cl.
*C02F 1/48* (2023.01)
*C02F 103/08* (2006.01)

(56) References Cited

U.S. PATENT DOCUMENTS

2009/0286308 A1* 11/2009 Berthelot .................. C09J 5/02
156/60
2019/0211154 A1* 7/2019 Lawton .................... C09D 5/08

* cited by examiner

MAGNETIC NANOPARTICLES FOR REMOVAL OF PARTICULATE WASTE

TECHNICAL FIELD

The present disclosure relates to functionalized nanoparticles and, more particularly, the synthesis and use of functionalized magnetic nanoparticles in the separation of waste from an environment.

BACKGROUND

Plastic materials production has surpassed the production of most other synthetic materials worldwide. Of the more than 8 billion metric tons of plastic produced to date, a large majority has accumulated in landfills or been released into the environment. Improperly discarded plastics may accumulate in the environment, where they are fragmented over time by environmental weathering leaving nanoplastic and microplastic/particles (NMPs) behind. These plastic particles may be present in drinking water, fresh and salt water, air, soil sediments, and many other environments, and exposure may pose a threat to humans, animals, and ecological systems.

Small environmental plastics may be referred to as either primary or secondary NMPs. Primary NMPs may be industrially produced and introduced to the environment already in a micro or nanoscale state (i.e., plastic dust, microbeads, pre-production plastic pellets or nurdles, and engineered polymeric nanoparticles). Secondary NMPs, not to be confused with secondary recycled plastics, may result from the environmental degradation of bulk plastic waste. Although most of the plastic waste comes from secondary plastics, primary plastics remain contaminants of concern due to their small size. Furthermore, due to their small size, detecting, quantifying, and removing such NMP particles from the environment remains an issue. As a result, some studies and reports may significantly underestimate the actual abundance of NMPs. This may be especially true in aqueous environments, which contain many different suspended and/or dissolved particles that can easily be carried over great distances.

Several methods have been employed for the removal of NMPs from water, and many of these methods are limited by minimum particle size and destructive methods which lack utility in natural or laboratory particle analysis. Other methods may be energy intensive and are not feasibly scaled up. For example, purification and isolation methods exist for the removal of NMPs from water (e.g., membrane filtration, evaporation, solvent extraction, density separation, and/or gravitational separation), but each of these methods has inherent shortfalls due to the unique properties of nanoplastics and the large volumes of water that must be processed. For example, some studies have shown that membrane filtration may be used for small volumes, but flow rates through nano-porous membranes are exceptionally slow and the membranes used may become clogged with adhered plastic particles, reducing the detected abundance of the particles. In other studies, density separation using saturated salt solutions has been successfully employed but has not been widely adopted due to the difficulty in collecting nanoparticles from the liquid-air interface. Other studies have demonstrated that chemical processes that may bind with plastic particles are too slow kinetically to be used efficiently in the cleanup process.

As nanoplastic pollution is increasing worldwide, high-throughput and reliable methods for the isolation and separation of NMPs from drinking water, wastewater, and/or environmental bodies of water are of particular interest.

SUMMARY

Applicant has recognized a need for improvements in the ability to effectively and efficiently remove NMP plastic particulate waste from various environments. The present disclosure provides materials and methods that can address one or more of the above-referenced drawbacks, as well as other possible drawbacks. It may be desirable to provide enhanced assemblies, devices, systems, and methods for removing plastic pollutants from an environment. Iron-containing nanoparticles, such as iron oxide nanoparticles (IONPs), may be functionalized to magnetize plastic particulate waste for removal. The particulate waste can be on the micro and/or nanoscale. The functionalized nanoparticles may attract and bind to the waste through adsorption, offering the advantages of relatively hazard-free administration of the cleaning treatment and a subsequent efficient collection process using an externally applied magnetic field.

According to some embodiments, a magnetic nanoparticle material may include a plurality of iron-containing nanoparticles having a core and a hydrophobic or amphiphilic coating disposed around the core. The magnetic nanoparticle material may be produced in ambient air, or in the absence of ambient air in an inert gas. The magnetic nanoparticle material may be configured to attract and bind with waste in an aqueous environment through adsorption.

In some examples, the hydrophobic or amphiphilic coating may include a functional group based on PDMS. The functional group may include at least one of a hydroxy-terminated PDMS and a carboxy-terminated PDMS. In some examples, the iron-containing nanoparticles further include an amphiphilic layer containing a PDMS-co-APMS block copolymer.

According to some embodiments, a method for making a magnetic nanoparticle material may include preparing mixture of polyacrylic acid (PAA) and a plurality of magnetic nanoparticles and purifying the mixture by dialysis to remove unreacted PAA. The method may further include combining the mixture of PAA and magnetic nanoparticles with a copolymer solution to coat the nanoparticles and produce a magnetic nanoparticle dispersion. The copolymer solution may include one or more of a hydroxy-terminated PDMS polymer, a carboxy-terminated PDMS polymer, and a PDMS-co-APMS block copolymer. The method may also include adding a strongly basic compound to the combined magnetic nanoparticle dispersion to increase the relative pH of the dispersion. In some examples, the strongly basic compound may include potassium hydroxide.

The method may include producing the magnetic nanoparticle material in ambient air, or in the absence of ambient air in an inert gas. The method may further include extracting the magnetic nanoparticles in the magnetic nanoparticle dispersion from an aqueous phase to an organic phase with diethyl ether. The method may also include reducing the relative pH of the aqueous phase of the magnetic nanoparticle dispersion to approximately 5.5 by adding an acidic solution.

According to some embodiments, a method for using magnetic nanoparticles to remove waste from an environment may include administering iron-containing nanoparticles to the environment and attracting target waste in the environment utilizing the magnetic properties of the iron-containing nanoparticles. The method may include binding, through adsorption, the waste to the iron-containing nanoparticles to isolate the waste from the remainder of the environment. The magnetic iron-containing nanoparticles may include one or more hydrophobic or amphiphilic coatings comprising a functional group based on a PDMS co-polymer. The adsorption between the plastic waste and the iron-containing nanoparticles may occur at the outer surface of one of the hydrophobic or amphiphilic coatings. The method may further include applying an external static or electromagnetic magnetic field to attract and remove the plastic waste bound to the iron-containing nanoparticles.

According to some embodiments, the magnetic iron-containing nanoparticles may further include an amphiphilic layer containing a PDMS-co-APMS copolymer.

Still, other aspects and advantages of these exemplary embodiments and other embodiments, are discussed in detail herein. Moreover, it is to be understood that both the foregoing information and the following detailed description provide merely illustrative examples of various aspects and embodiments and are intended to provide an overview or framework for understanding the nature and character of the claimed aspects and embodiments. Accordingly, these and other objects, along with advantages and features of the present disclosure, will become apparent through reference to the following description and the accompanying drawings. Furthermore, it is to be understood that the features of the various embodiments described herein are not mutually exclusive and may exist in various combinations and permutations.

BRIEF DESCRIPTION OF THE DRAWINGS

The accompanying drawings, which are included to provide a further understanding of the embodiments of the present disclosure, are incorporated in and constitute a part of this specification, illustrate embodiments of the present disclosure, and together with the detailed description, serve to explain principles of the embodiments discussed herein. No attempt is made to show structural or molecular details of this disclosure in more detail than may be necessary for a fundamental understanding of the embodiments discussed herein and the various ways in which they may be practiced. According to common practice, the various features of the drawings discussed below are not necessarily drawn to scale. Dimensions of various features and elements in the drawings may be expanded or reduced to more clearly illustrate embodiments of the disclosure.

DETAILED DESCRIPTION

Figure 1:
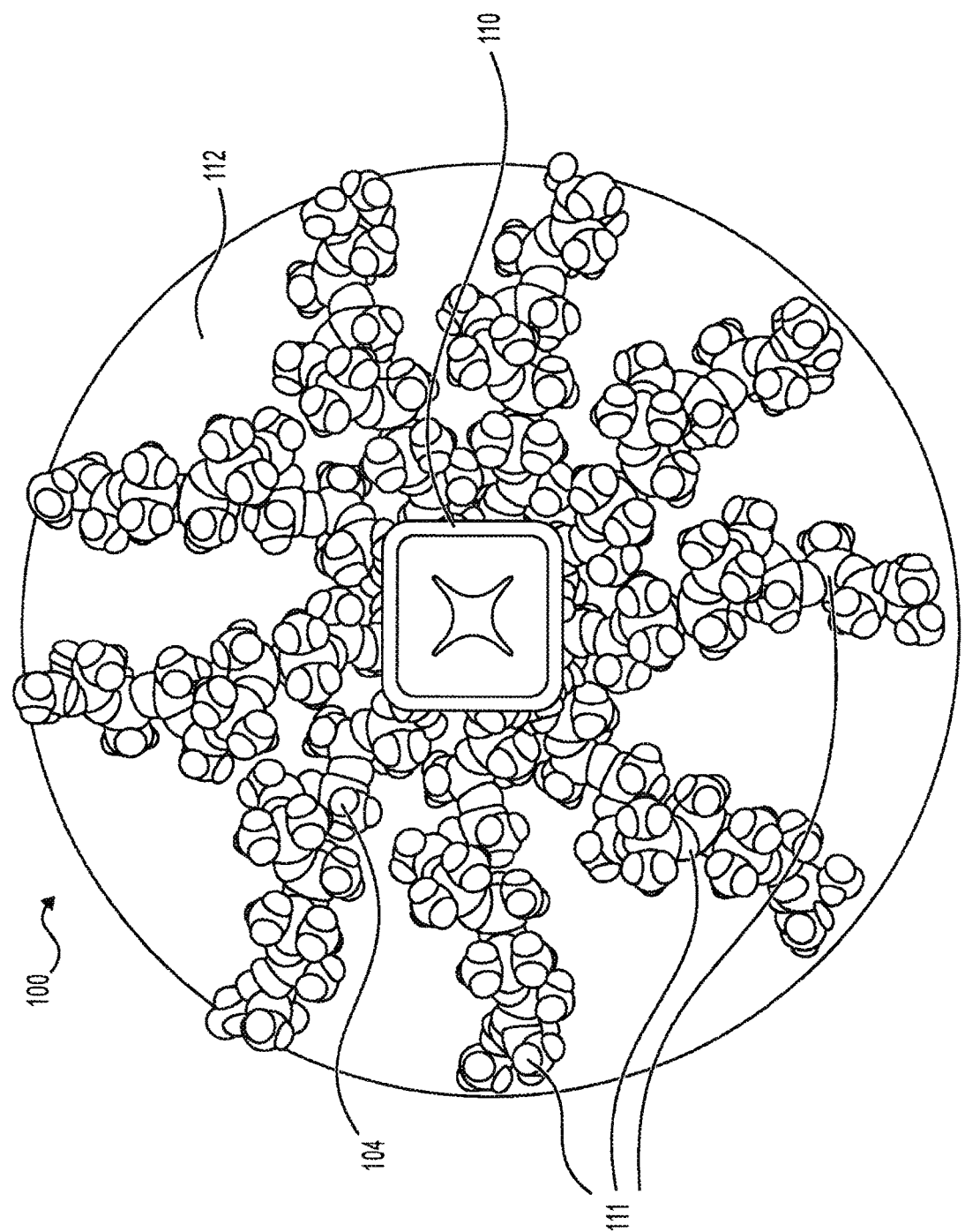
FIG. 1 is a schematic view an example functionalized magnetic nanoparticle for the separation of waste from an environment, according to certain embodiments of the disclosure.

The drawings include like numerals to indicate like parts throughout the several views, the following description is provided as an enabling teaching of illustrative embodiments, and those skilled in the relevant art will recognize that many changes may be made to the embodiments described. It also will be apparent that some of the desired benefits of the embodiments described may be obtained by selecting some of the features of the embodiments without utilizing other features. Accordingly, those skilled in the art will recognize that many modifications and adaptations to the embodiments described are possible and may even be desirable in certain circumstances. Thus, the following description is provided as illustrative of the principles of the embodiments and not in limitation thereof.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, in particular, to mean "including but not limited to," unless otherwise stated. Thus, the use of such terms is meant to encompass the items listed thereafter, and equivalents thereof, as well as additional items. Furthermore, many of the chemical and/or laboratory processes and procedures referred to herein are well understood in literature and in the art, and therefore the exact procedural steps are not described in detail. For example, oxidation/reduction reactions, precipitation, dialysis, and other processes are widely used not just in the synthesis of nanoparticles, but in the wider scientific community and the adaptation to the present description and methods will be understood by those of skill in the art.

A functionalized magnetic nanoparticle may be used to effectively isolate and clean potentially hazardous materials, such as NMPs, from the environment. Magnetic nanoparticles have been used in such applications as magnetic separation, catalysis, MRI contrast agents, and vectorization. More specifically, magnetized iron-containing nanoparticles (such as IONPs) may be used, for example, as part of an adsorption process to magnetize plastic particulate waste for removal. Magnetic nanoparticles may also be, for example, comparatively easy to handle and use when compared with alternative adsorbents. The specific magnetization of nanoparticles may address the shortfalls of currently utilized methods for NMP collection in wastewater treatment, environmental remediation, and even laboratory analytics, which may be inefficient, destructive, and/or kinetically slow. The particulate waste can be on the micro and/or nanoscale. The functionalized nanoparticles may attract and bind to the waste through adsorption, offering the advantages of relatively hazard-free administration of the cleaning treatment and a subsequent efficient collection process using an externally applied magnetic field.

According to some embodiments, a magnetic nanoparticle material may include a plurality of iron-containing nanoparticles having a core and a hydrophobic or amphiphilic coating disposed around the core. The magnetic nanoparticle material may be produced in ambient air, or in the absence of ambient air in an inert gas. The magnetic nanoparticle material may be configured to attract and bind with waste in an aqueous environment through adsorption. In some examples, the hydrophobic or amphiphilic coating may include a functional group based on PDMS. The functional group may include at least one of a hydroxy-terminated PDMS and a carboxy-terminated PDMS. In some examples, the iron-containing nanoparticles further include an amphiphilic layer containing a PDMS-co-APMS block copolymer.

Referring to the figures, FIGS. 1-4 illustrate examples of magnetic nanoparticles that have been functionalized for the separation of particulate waste, such as NMPs, from water. The separation may be, for example, used in adsorption processes and in conjunction with, or as a replacement for, treatment methods for natural and manmade bodies of fresh and saltwater. The nanoparticles and adsorption processes are also useful in laboratory testing of particle and process efficiency and effectiveness. FIG. 1 is a schematic assembly of an example magnetic nanoparticle developed according to the methods disclosed herein. In the illustrated example, the functionalized magnetic nanoparticle 100 may have an iron-containing nanoparticle 110 core having one or more functionalizing components 104. In some examples, the functionalizing components 104 may include branching chains of copolymers 111. The iron-containing nanoparticle 110 may be, for example, an IONP and classified into different phases (i.e., magnetite, hematite, maghemite, wüstite, etc.) with a formula of the structure $Fe_xO_y$ (i.e., an $Fe_xO_y$ NP). In some examples, an example $Fe_xO_y$ nanoparticle 110 may exhibit or be modified with magnetic behavior, allowing for high-gradient magnetic separation of the particles from a non-magnetic medium. A ferromagnetic nanoparticle can maintain its magnetized state after an external magnetic field is removed. Therefore, ferromagnetic iron/iron oxide particle combinations may be useful because bulk iron has a high mass magnetization value $M_s$ of >210 emu/g, and iron oxides may be in the $M_s$ range of approximately 90 emu/g. A superparamagnetic particle may also be exploited to avoid interparticle interactions such as agglomeration.

The iron-containing nanoparticle 110 of the functionalized magnetic nanoparticle material 100 may be, for example, magnetite ($Fe_3O_4$), maghemite ($\gamma$-$Fe_2O_3$), and/or other particles with naturally strong magnetic properties. Due to their size, a nanoparticle materials may possess some optical, magnetic, and electrical properties which cannot be found in their bulk form, and in the nanometer range of nanoparticles the quantum size effect dominates the magnetic and electrical properties affecting the behavior of the material. In the nanoscale, there is an impact from specific individual atoms and molecules, while in bulk form, properties may be attributed to an average of the quantum forces affecting all the atoms. As a result, a decrease in nanoparticle size may push magnetic properties into regions of paramagnetic and superparamagnetic behavior (i.e., materials susceptible to being magnetized when placed in a magnetic field). Magnetic $Fe_3O_4$ nanoparticles, for example, may be superparamagnetic at or around the single-domain/multi-domain size limit, approximately 20 nm (Li et al., 2017). High levels of magnetism may allow the magnetic nanoparticles 100 to be effective agents for attracting targets even at relatively low concentrations within the environment.

Although the magnetic nanoparticle material 100 examples herein often use IONPs as the example iron-containing nanoparticle 110 core, it may be appreciated that other iron-containing compounds and substances capable of effecting similar properties and/or characteristics may also be employed. For example, the iron-containing nanoparticle 110 may contain elemental iron, an iron-nitride compound, a compound having iron in combination with a rare earth element, or formulations achieved through reaction with iron oxides. In certain embodiments, the iron-containing nanoparticle 110 may contain other elements as dopants.

The functionalized magnetic nanoparticles 100 may be prepared having common particle dimensions in the range from approximately 1-500 nm, although depending on the application other sizes such as 1-50 nm and 1-20 nm are also anticipated. The size and shape of the of the nanoparticles may be predicted and adjusted during synthesis using thermodynamics by controlling factors such as the pH, temperature, concentration, and/or ionic strength/ratio. Changing the size and shape of the nanoparticles to manipulate the surface energy contribution may also be an effective way to achieve more stable nanoparticles.

As ionic iron $Fe^{2+}$ and $Fe^{3+}$ used in mixtures and solutions can have strong molecular affinities, different environments may be used to synthesize and modify the example functionalized magnetic nanoparticles 100 with desired characteristics. In some examples, the magnetic nanoparticles 100 may be produced with the desired properties in ambient air so that certain molecules are allowed to naturally oxidize and passivate. Alternately, in some examples, molecules that are nominally less stable and readily oxidized in the presence of oxygen may be produced in an oxygen-free environment using an inert gas, such as nitrogen or argon. Example magnetic nanoparticles produced in both types of environments are described and compared in detail herein. Other factors during synthesis such as, for example, temperatures/rates in extraction and thermal decomposition steps and the type of solvents used, may also influence the makeup and type of the resulting nanoparticles (i.e., $Fe_xO_y$ composition, spherical vs. cubic, FCC/BCC lattice structure, etc.).

Magnetic nanoparticles may be functionalized, for example, through the addition of an applied layer or coating, which may enhance the specificity and/or yield greater affinity for particular target molecules. In some embodiments, the functionalizing components 104 of the magnetic nanoparticles 100 may include a coating 114 which is hydrophobic to more effectively isolate attracted waste in a surrounding aqueous environment. In other embodiments, the coating 114 may be amphiphilic. In certain embodiments, the coating 114 may be hydrophilic. Chemical processing may be utilized whereby functional groups or molecules with known properties are bonded to the nanoparticles. The nanoparticles may be, for example, embedded in a polymeric matrix to form functionalized particles which contain the properties of both the matrix and the nanoparticles.

It can be difficult, however, to achieve particle stability when attempting to uniformly disperse nanoparticles in a polymeric matrix due to differences in surface energies, chain lengths, and other factors (Sötebier et al., 2012). Therefore, to form functionalized magnetic nanoparticles 100 with these coatings, a compatibilization process may be used to prepare the iron-containing nanoparticles for coating. The compatibilization process may start with iron-containing nanoparticles 110 contained in a mixture with an oxidizer such as peracetic acid (PAA). PAA solutions may have high oxidation potential and therefore are effective in, for example, reduction reactions during synthesis as an efficient pathway for linking other structures. For example, the copolymer chains 111 in FIGS. 1-3 may be chemically bonded to the iron-containing nanoparticle 110 with a PAA solution as an agent. In other examples, the materials for hydrophobic or amphiphilic coatings 114 may be deposited, bonded, plated, sputtered, or otherwise shelled as thin films on the surfaces of parent iron-containing nanoparticle molecules.

The properties of the coating 114 of the magnetic nanoparticles 100 may be, for example, based on a functional group such as Polydimethylsiloxane (PDMS) block copolymer. PDMS may be hydrophobic and selected for its propensity to interact with the carboxylate functions of the PAA compatibilization agent. PDMS coatings are also used for their properties as a hydrophilization agent (i.e., increase water contact angles ≥100°) in microfluidics and in the fabrication of microfluidic devices, in addition to their tendency to disperse uniformly in commonly used solvents such as toluene and diethyl ether. PDMS may further offer advantages such as low cost, chemical inertness, non-toxicity, and the ability to work predictably in the small-scale micrometer range.

Figures 2A, 2B:
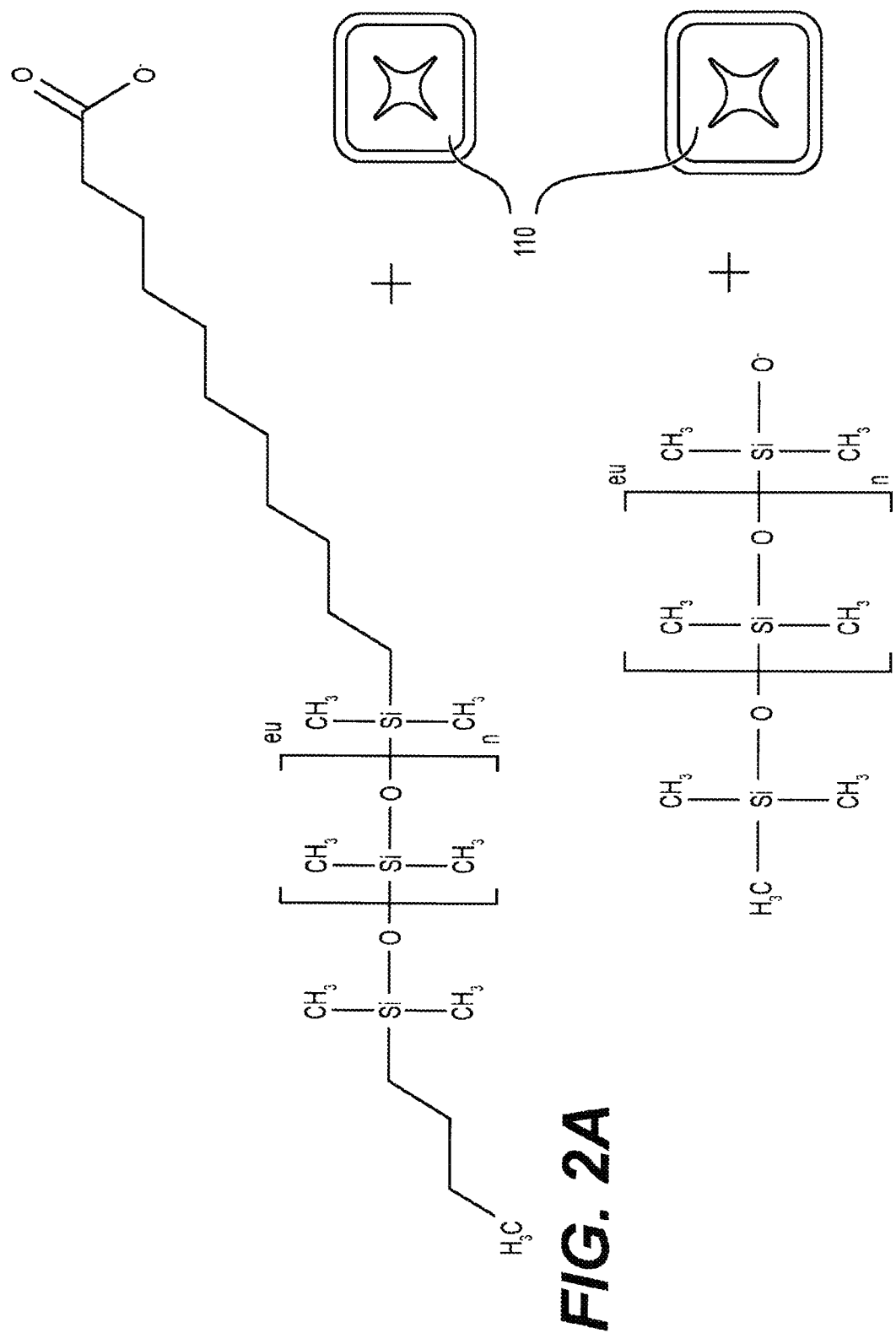
FIG. 2A is a representation of an example functionalization of magnetic nanoparticles via carboxy-terminated PDMS, according to certain embodiments of the disclosure.
FIG. 2B illustrates an example functionalization of magnetic nanoparticles via hydroxy-terminated PDMS, according to certain embodiments of the disclosure.

The PDMS copolymers may be placed in solution and bonded to the compatibilized iron-containing nanoparticles 110 to form a coating for the functionalized magnetic nanoparticles 100. The nanoparticles and PAA agent may be combined in a mixture with the copolymer solution. In some examples, a PAA:nanoparticle mixture may be combined with a copolymer solution having a carboxyl-terminated PDMS group (C-PDMS), as seen in FIG. 2A. In other examples, the copolymer solution may be a hydroxy-terminated PDMS group (PDMS-OH), as seen in the example in FIG. 2B.

Figure 3:
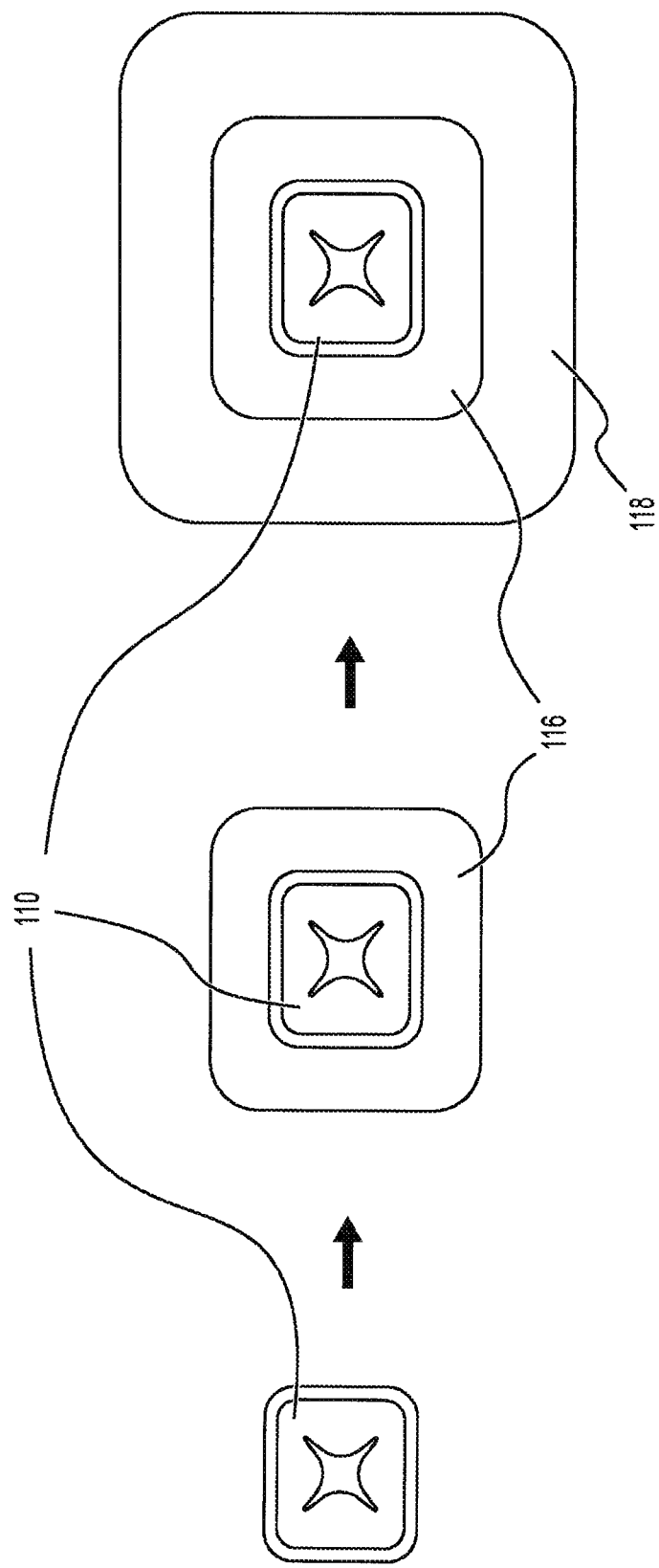
FIG. 3 shows an example functionalization of magnetic nanoparticles via PAA:PDMS-co-APMS, according to certain embodiments of the disclosure.

In some embodiments, the PAA:nanoparticle mixture may be functionalized by coating with a PDMS-co-aminopropylmethylsiloxane (APMS) block copolymer. The iron-containing nanoparticle 110 may receive an initial coating with a PAA 116 agent in a mixture, followed by an attractive electrostatic interaction of a PDMS-co-APMS 118 copolymer solution with the PAA 116, as illustrated in FIG. 3. The PAA coating 116 may be used to stabilize the nanoparticles in water or another mixture medium, after which the PDMS-co-APMS coating 118 may give the particles hydrophobic or amphiphilic properties.

According to some embodiments, a method for making a magnetic nanoparticle material may include preparing mixture of polyacrylic acid (PAA) and a plurality of magnetic nanoparticles and purifying the mixture by dialysis to remove unreacted PAA. The method may further include combining the mixture of PAA and magnetic nanoparticles with a copolymer solution to coat the nanoparticles and produce a magnetic nanoparticle dispersion. The copolymer solution may include one or more of a hydroxy-terminated PDMS polymer, a carboxy-terminated PDMS polymer, and a PDMS-co-APMS block copolymer. The method may also include adding a strongly basic compound to the combined magnetic nanoparticle dispersion to increase the relative pH of the dispersion. In some examples, the strongly basic compound may include potassium hydroxide.

The method may include producing the magnetic nanoparticle material in ambient air, or in the absence of ambient air in an inert gas. The method may further include extracting the magnetic nanoparticles in the magnetic nanoparticle dispersion from an aqueous phase to an organic phase with diethyl ether. The method may also include reducing the relative pH of the aqueous phase of the magnetic nanoparticle dispersion to approximately 5.5 by adding an acidic solution.

According to some embodiments, a method for using magnetic nanoparticles to remove waste from an environment may include administering iron-containing nanoparticles to the environment and attracting target waste in the environment utilizing the magnetic properties of the iron-containing nanoparticles. The method may include binding, through adsorption, the waste to the iron-containing nanoparticles to isolate the waste from the remainder of the environment. The magnetic iron-containing nanoparticles may include one or more hydrophobic or amphiphilic coatings comprising a functional group based on a PDMS co-polymer. The adsorption between the plastic waste and the iron-containing nanoparticles may occur at the outer surface of one of the hydrophobic or amphiphilic coatings. The method may further include applying an external static or electromagnetic magnetic field to attract and remove the plastic waste bound to the iron-containing nanoparticles.

Figure 4B:
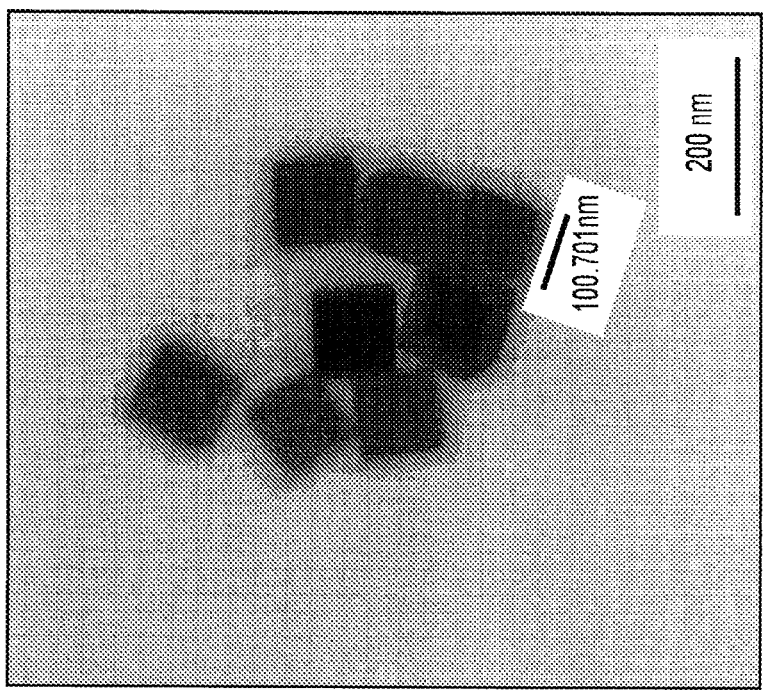
FIG. 4B is a TEM image of example magnetic nanoparticles produced in ambient air, according to certain embodiments of the disclosure.
Figure 4A:
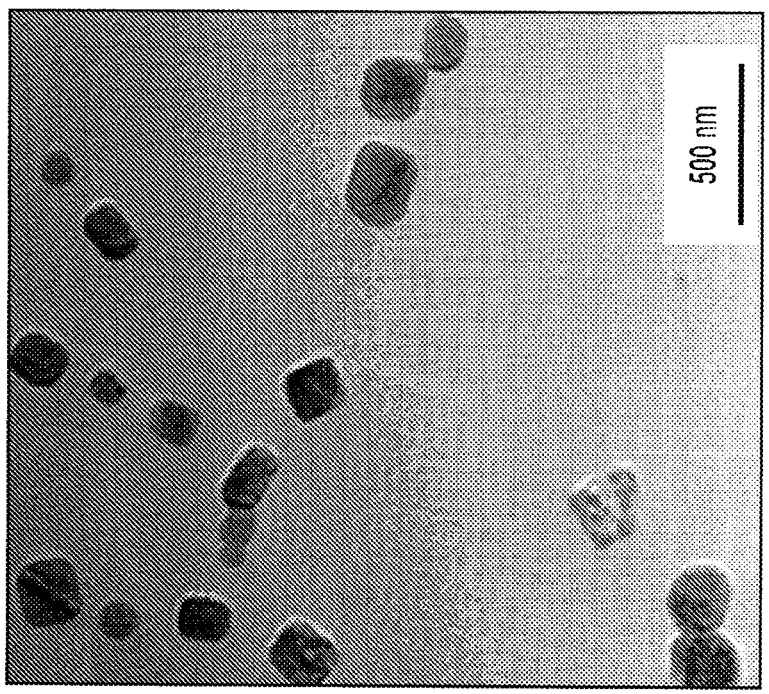
FIG. 4A is a TEM image of example magnetic nanoparticles produced in argon showing cubic morphology, according to certain embodiments of the disclosure.

Example functionalized magnetic nanoparticles 100 based on iron oxides (IONPs) were synthesized as described in the present disclosure for characterization and evaluation. Produced example IONPs are shown and characterized in FIGS. 4-6. Transmission electron microscopy (TEM) micrograph images of example nanoparticles are shown in FIG. 4A and FIG. 4B prior to application of the hydrophobic and/or amphiphilic coating. FIG. 4A depicts example nanoparticles produced air-free in argon that were later coated with C-PDMS. FIG. 4B shows example nanoparticles at greater magnification produced in air and later coated with either PAA:PDMS-co-APMS or PDMS-OH. The micrographs indicate the particle morphology may have a nearly cubic or rhombohedral geometry and have a tendency, in some examples, to have a long chain-like structure.

After receiving a coating, the mean particle size of the example magnetic nanoparticles produced were measured using TEM microscopy images. The measured mean sizes of the particles were as follows: PAA:PDMS-co-APMS 107.02 nm (±17.69 nm), PDMS-OH 96.89 nm (±39.22 nm), and C-PDMS 90.79 nm (±32.01 nm). The size ranges were consistent for particles produced in both inert argon and ambient air environments.

Figure 5A:
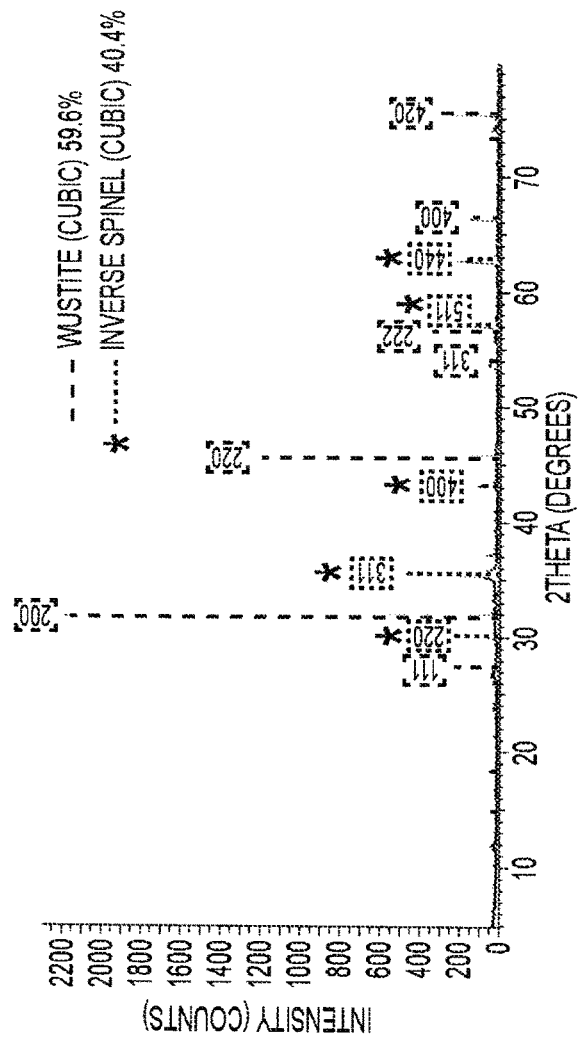
FIG. 5A shows an XRD spectrum of example magnetic nanoparticles produced in argon, according to certain embodiments of the disclosure.
Figure 5B:
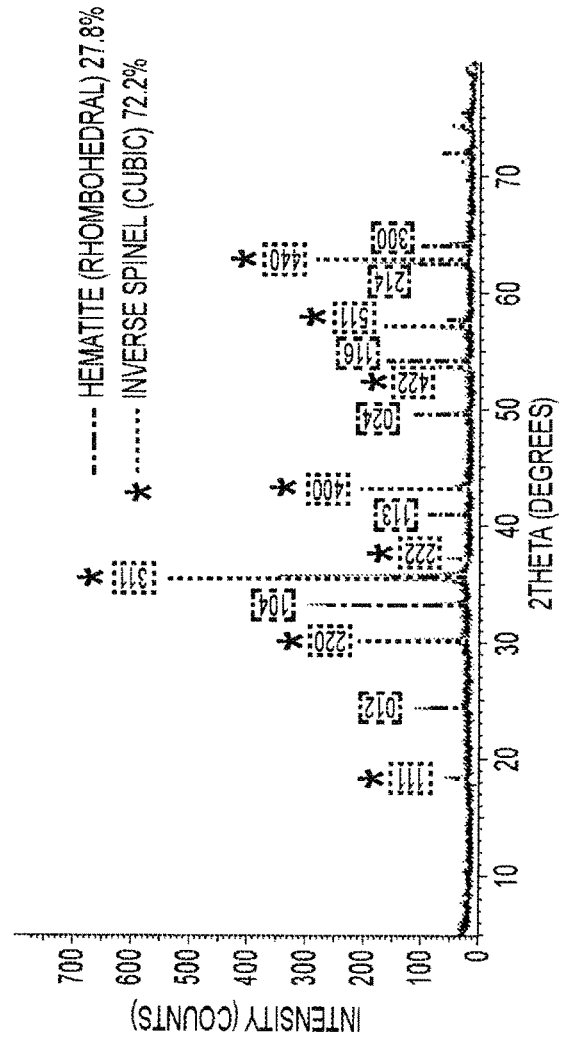
FIG. 5B shows an XRD spectrum of example magnetic nanoparticles produced in ambient air, according to certain embodiments of the disclosure.

X-ray diffraction (XRD) was also used to characterize the produced magnetic nanoparticles. XRD spectra for various example iron oxide nanoparticles (IONPs) produced as disclosed herein are provided in FIGS. 5A-5B. XRD (θ/2θ) was performed using a $CuK_\alpha$ source on nanoparticles produced under argon or in air, prior to the coating polymer functionalization. Magnetic iron oxide nanoparticles may naturally have two or more phases, with at least one of the phases being a ferromagnetic inverse spinel phase of iron oxide, as indicated by starred (*) indices in the images. Both the XRD profiles of nanoparticles synthesized air-free under argon flow (FIG. 5A) and nanoparticles synthesized in ambient air (FIG. 5B) revealed two distinct phases as peaks on the XRD spectra. FIG. 5A shows IONPs having a crystal phase containing 59.6% wüstite (#) and 40.4% spinel (*) phase under argon. FIG. 5B shows a crystalline structure of 72.2% spinel (*) and 27.8% hematite (+) for IONPs produced in ambient air (hematite being the product of an oxygen reaction with magnetite). The inverse *spinel phase may be attributed to the metastable maghemite phase or the mixed valence phase magnetite ($Fe_3O_4$). The XRD patterns indicate the IONPs produced in air may be perform particularly well under magnetization measurements due to the higher percentage of the spinel (*) crystal phase(s) with ferromagnetic ordering. The other phases identified, wüstite (#) and rhombohedral hematite $\alpha$-$Fe_2O_3$ (+), typically have crystalline phases with antiferromagnetic ordering.

Figure 6:
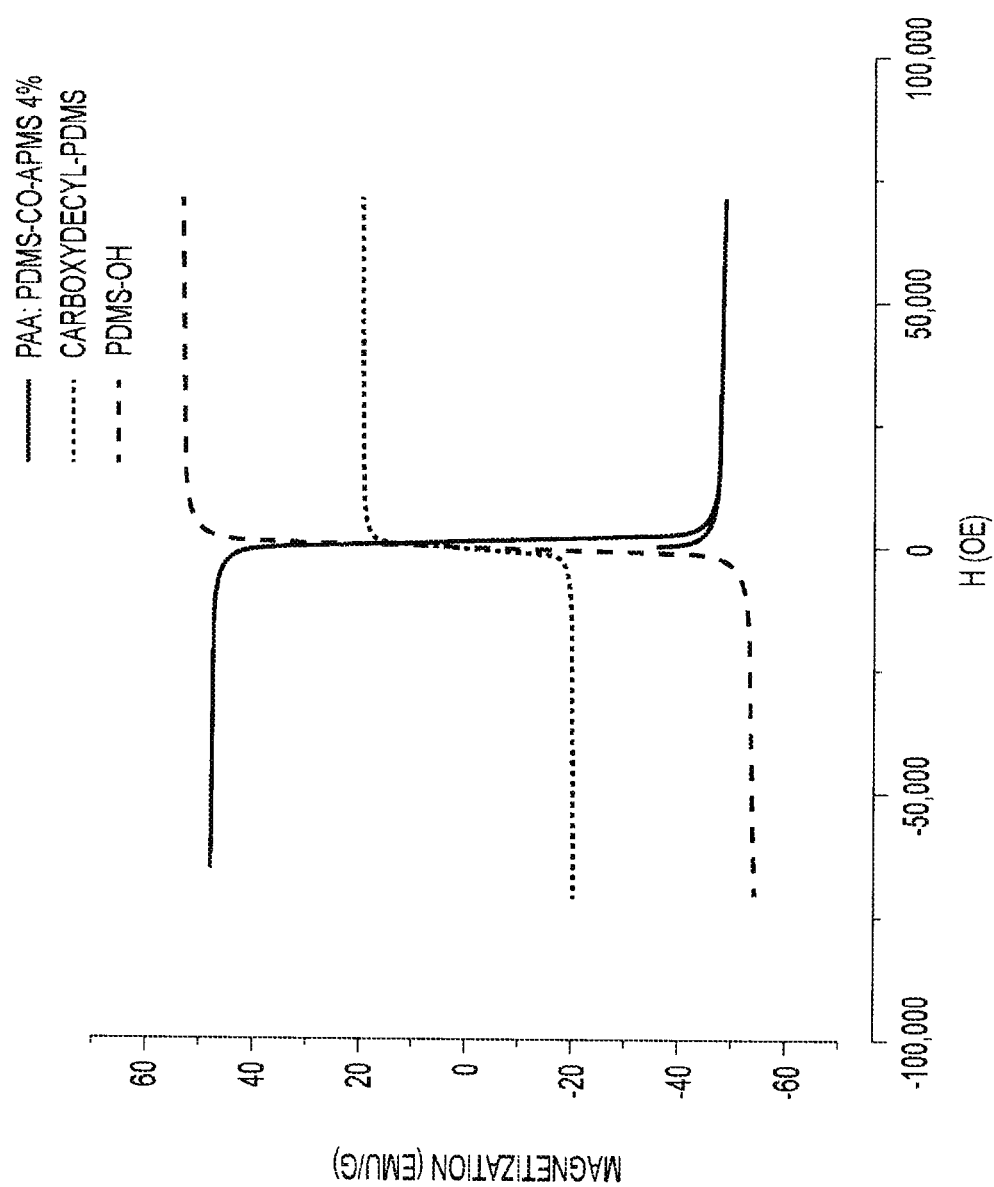
FIG. 6 is SQUID magnetometry hysteresis results demonstrating the range of $M_s$ values for three different types of nanoparticle samples having a coating based on a PDMS copolymer, according to certain embodiments of the disclosure.

FIG. 6 show hysteresis curves of superconducting quantum interface device (SQUID) magnetometry magnetization data for example functionalized IONPs produced according to elements of the disclosure. In accordance with the XRD results, particles produced in air may have higher $M_s$ values, in the range of approximately 50-55 emu/g, than those produced under argon. This may be a result of the higher proportion of phase, giving an $M_s$ value closer to that of bulk maghemite (approximately 76 emu/g). IONPs coated with C-PDMS in argon yielded lower $M_s$ values of approximately 20 emu/g. Slight differences when comparing the magnetization of the various IONPs produced may be due to cants in the applied coatings, dead layers of nonmagnetic surface oxides, and/or other factors. Superparamagnetic behavior was also observed due to the lack of coercivity in the hysteresis curves (i.e., near-asymptotic behavior when the applied magnetic force is reversed).

In some embodiments, the functionality of the magnetic nanoparticles may also be changed by design of the binding behavior with particular target waste molecules. The design may include characteristics such as surface charge and/or binding molecules such as receptors. For example, affinity of the nanoparticles for certain target molecules may be enhanced by changing the particle surface groups of the coating(s), maximizing the number of charged surface groups in the coating(s), adding different surface groups to the coating(s), and/or adding amino and other strongly reactive groups to the coating(s).

The type of preparation (e.g., physical, chemical, biological) and the chosen method for synthesizing the nanoparticles may have a significant effect on the size, shape, distribution, and surface chemistry of the resulting particles, which may influence their applications. In some embodiments, the functionalized IONPs may be produced using a modified solvothermal procedure based on the decomposition of iron oleate. Alternatively, IONPs may be produced using nanoprecipitation techniques or thermal decomposition. The method may utilize easy and reproducible synthesis techniques that provide IONPs that are stable and well-dispersed. The functionalized IONPs may be synthesized in ambient air or an inert gas, for example, as described herein.

Figure 7:
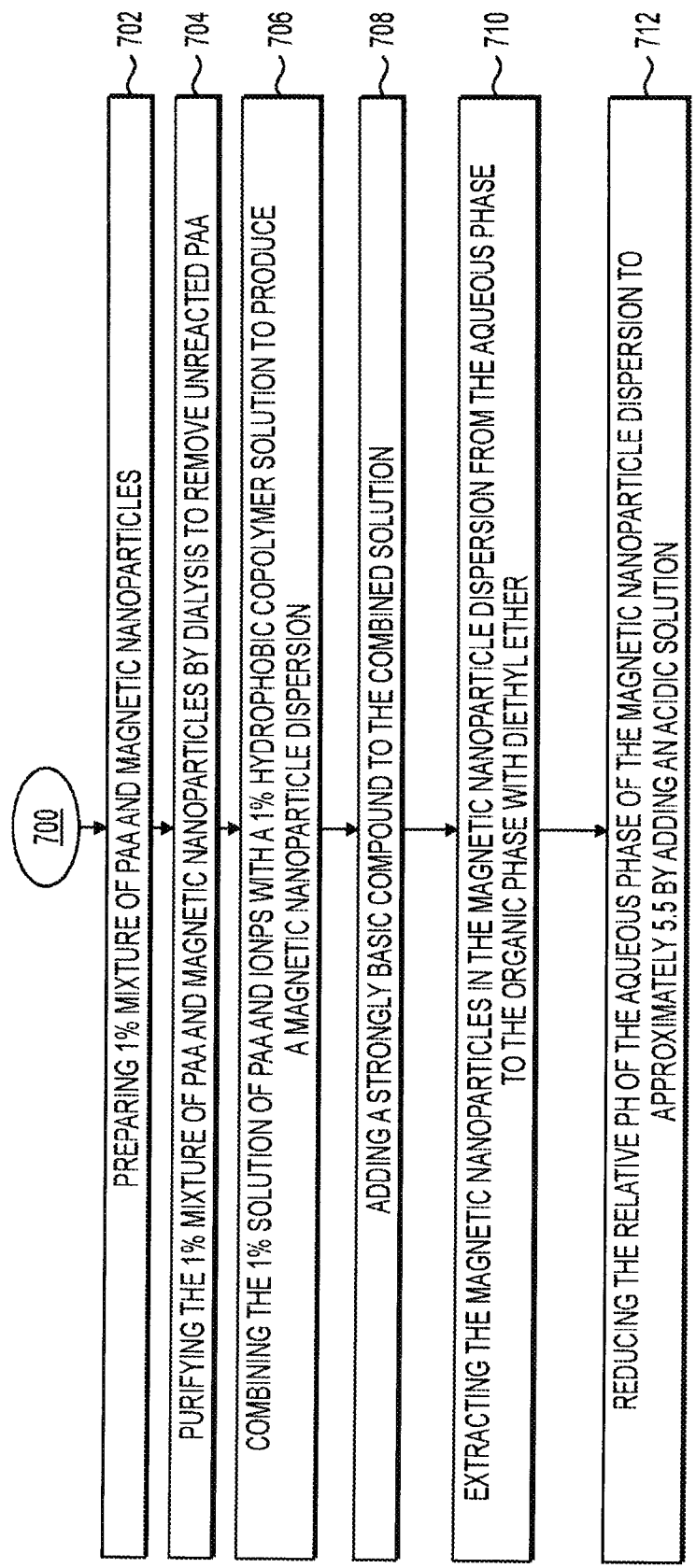
FIG. 7 is a flow diagram of an example method for producing functionalized magnetic nanoparticles, according to certain embodiments of the disclosure.

Having been characterized in FIGS. 4-6, an example method for producing functionalized magnetic nanoparticles such as those disclosed herein is shown in FIG. 7. The example method 700 is illustrated as a collection of blocks in a logical flow graph, which represent a sequence of operations. In some embodiments of the method 700, one or more of the blocks may be manually and/or automatically executed. Oxidation/reduction reactions, precipitation, coprecipitation, dialysis, and other processes, for example, are widely used in the field including in the synthesis of nanoparticles. As a result, the example method disclosed is not meant to be strictly limited to these processes, as those of skill in the art will understand their use directed to a specific end result in facilitating chemical reactions and molecular behavior. In addition, the order in which the operations are listed and described is not intended to be construed as a limitation, and any number of the described blocks may be combined in any order and/or in parallel to implement the method.

The example method 700 at 702 may include preparing a mixture of PAA and magnetic nanoparticles. In some examples, 1% (solute to solvent) ratio mixtures may be used. Mixtures and solutions of PAA have very high oxidation potential and therefore are effective compatibility agents in nanoparticle synthesis reactions as well as in the food and beverage industries and pharmaceuticals as antimicrobial agents and sanitizers. The PAA:nanoparticle mixtures may be produced by, for example, combining acetic acid and hydrogen peroxide in an aqueous solution. In some embodiments, the mixture may be a 1% (solute to solvent) ratio. The resulting size of the synthesized particles may be influenced as desired by modifying factors of this mixture, as described herein. For example, studies have demonstrated that an increase in mixing rate and/or the further addition of a base to the reactants may result in a smaller particle size, which may bolster the magnetic and electrical properties of the nanoparticles (Ravindra et al. 2012).

The example method 700 at 704 may include purifying the PAA:nanoparticle solution through dialysis or similar means. For example, smaller extraneous molecules may be selectively filtered and allowed to diffuse out of the equilibrium solution through a semipermeable membrane. The membrane may be sized with a particular molecular weight cut-off for the targeted IONP sizes, and a buffer solution may be used to receive filtered molecules. The dialysis process may remove unreacted PAA polymer chains from the mixture so it does not interfere with other steps of the synthesis.

The method at 706 may then involve combining the mixture of PAA and nanoparticles with a copolymer solution to produce a magnetic nanoparticle dispersion. The copolymer solution may coat and render the IONPs hydrophobic and/or amphiphilic. The copolymer solution may be, for example, a 1% (solute to solvent) ratio. In some examples, step 706 may involve coating nanoparticles produced in argon with C-PDMS. In other examples, step 706 may include coating nanoparticles produced in air with a PDMS-co-APMS block copolymer or PDMS-OH as described herein. In an embodiment, the PDMS-co-APMS block copolymer may be initially dissolved in ethyl ether at a weight fraction of 1% and the added to colloidal IONP mixture and mixed gently at room temperature. The oleate may be removed from the mixture by, for example, adding an acid such as HCl. In some examples, the coated nanoparticles can undergo further dialysis steps to cleanse the mixture of any remaining unlinked PAA polymer chains.

The example method 700 at 708 may include adding a strongly basic compound to the dispersion to increase the relative pH of the mixture. The base may be, for example, potassium hydroxide or a similar compound. The example method 700 at 710 may then include extracting the magnetic nanoparticles in the mixture by liquid-liquid extraction. In this process, the nanoparticles may be separated from the aqueous phase to an organic phase. The extraction to the organic phase may, for example, use organic solvent such as diethyl ether. The extraction process may be repeated multiple times as necessary until a measured amount of nanoparticles have been extracted to the organic phase, or until a desired viscosity is reached. After extraction, the organic fractions may be dried with a drying agent.

In some embodiments, the example method 700 at 712 may also include a step of reducing the relative pH of the aqueous phase of the nanoparticle dispersion by mixing with an acidic solution. In some examples, this reduction in pH may be done prior to extracting the IONPs to the organic layer. In a specific example, the pH may be reduced to approximately 5.5 through the addition of an HCl acidic solution.

In synthesizing example magnetic nanoparticles as described herein, Applicant has found success in incorporating some green chemistry methods endorsed by the U.S. Environmental Protection Agency (EPA). For example, implementing heptane instead of hexane and the use of soluble iron chloride salts may improve recyclability and reduce the use of hazardous solvents and reagents which in some concentrations may be considered environmental toxins.

Figure 8:
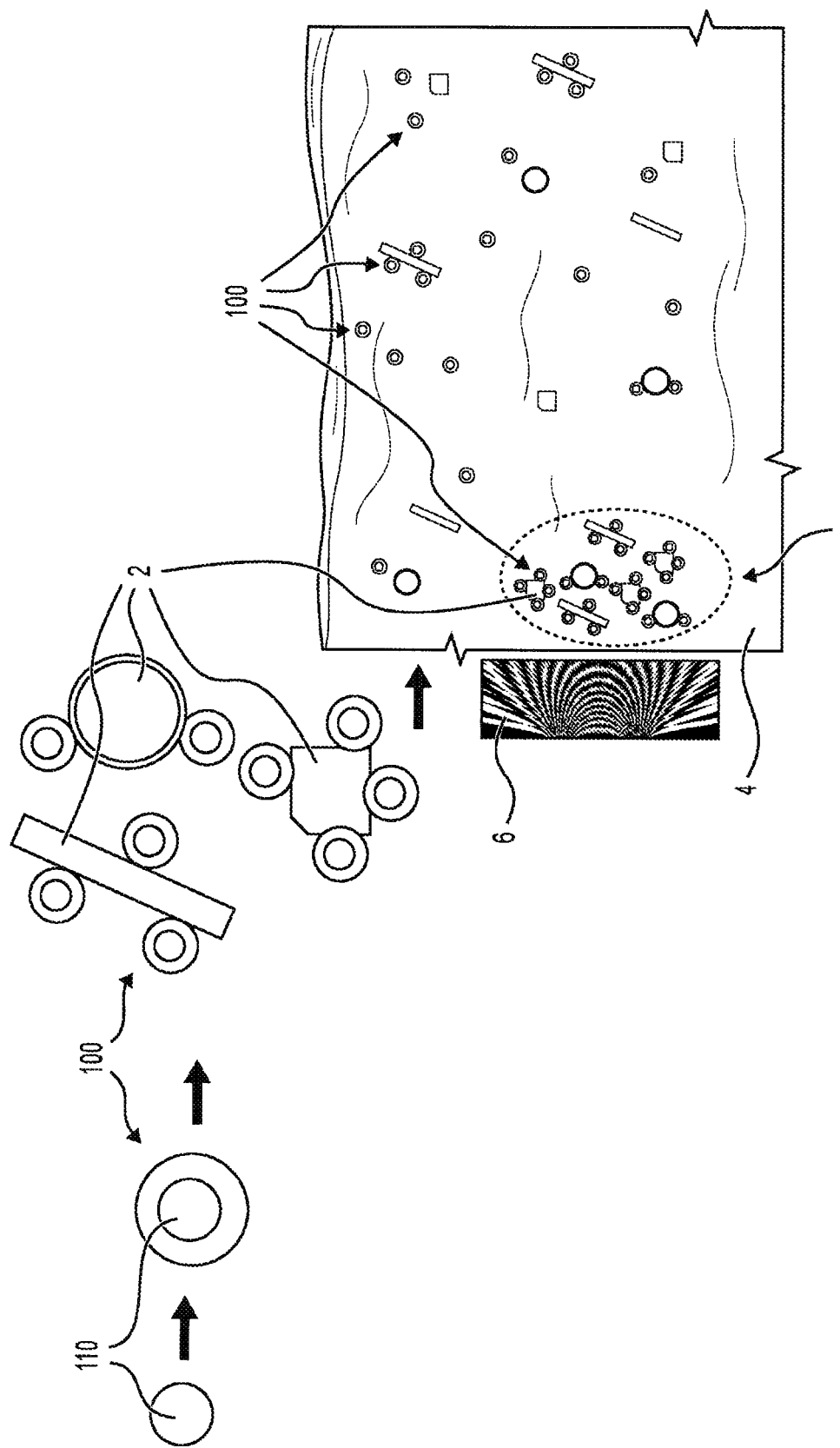
FIG. 8 is a pictorial illustration of a possible use for functionalized magnetic nanoparticles to remove NMPs from water, according to certain embodiments of the disclosure.
Figure 9:
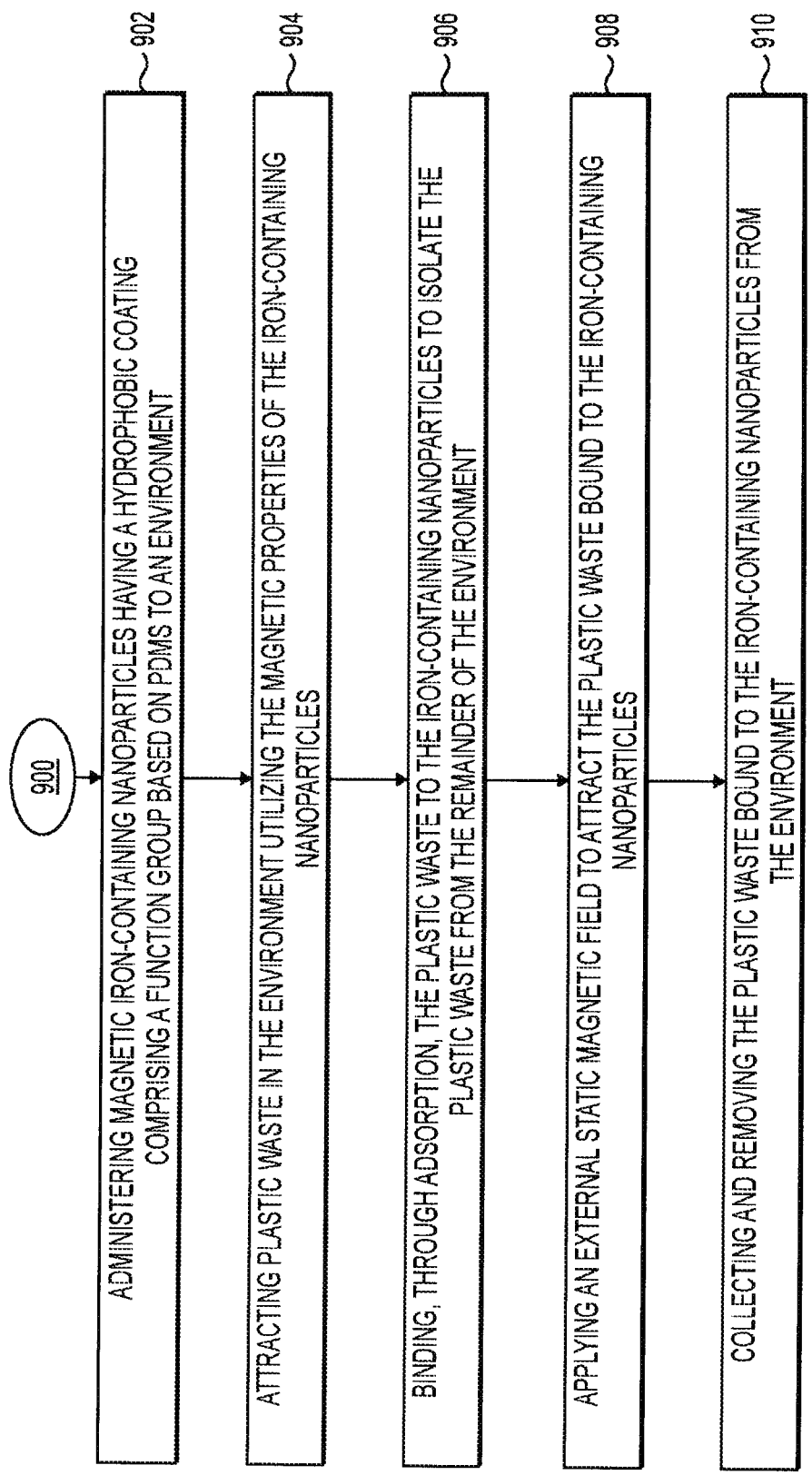
FIG. 9 is a flow diagram of an example method for using functionalized magnetic nanoparticles to remove waste from an environment, according to certain embodiments of the disclosure.

FIGS. 8-9 illustrate example methods for the magnetic separation waste from an environment. The figures show nanoplastics and microplastics in an aqueous environment, and are not intended to be limiting. For example, the aquatic environment 4 may be freshwater, saltwater, and/or another environment with dissolved impurities or a combination of these. Other target molecules and environments can also be contemplated. FIG. 8 is a brief visualization of a procedural flow for using functionalized magnetic nanoparticles 100 to isolate and remove NMPs 2 in an aquatic environment 4 through an adsorption process. The visualization represents a sequence of operations in which the magnetic nanoparticles 100 bind with the target waste 2 through adsorption and isolate the target waste for subsequent removal from the environment 4. A select set of functionalized magnetic nanoparticles 100 may be released into the environment 4 containing the NMP waste 2. The nanoparticles may have an iron-containing core and may be synthesized, for example, using a modified solvothermal procedure as described herein. The example IONPs 110 may be functionalized through the addition of a hydrophobic or amphiphilic coating 112 to improve performance and the ability to isolate an NMP 2 within the environment 4.

Adsorption methods are broadly utilized to remove a variety of pollutants from waters. Adsorption is a well-characterized equilibrium separation procedure with several benefits such as cost, ease of incorporation, and simplicity. The process of adsorption is a surface phenomenon whereby atoms, ions, and/or molecules are adhered to a surface, creating a film of the adsorbate on the surface of the adsorbent. The example nanoparticles 100 like those shown in FIGS. 1-3 and described herein focus on the properties of hydrophobicity and magnetism such that NMPs 2 are isolated and bound to the carrier efficiently from an aquatic environment with little hazardous disturbance or disruption (i.e., chemical, physical, etc.) to other distributed compounds and particles which may be present. The adsorption operation of the magnetic nanoparticles and the NMP targets at the micro and nanoscale may also leverage the enhanced magnetic properties of the nanoparticles at the molecular level, as described.

The example NMP particles shown in FIG. 8 may be present in fresh and salt water, air, soil sediments, and many other environments. Plastic waste may enter the environment 4 in many ways. Discarded plastic products may collect and be fragmented and broken down over time by environmental weathering leaving nanoplastic and microplastic/particles behind. Depending on environmental exposure and the types of weathering, the NMPs 2 may have a number of shapes and sizes, and the resultant geometry may be more complex than the simplified example shapes shown in FIG. 8.

The step of binding to the NMP waste 2 may be accomplished by adding the functionalized magnetic nanoparticles 100 to the environment 4 for a time sufficient to allow the nanoparticles to attract and contact their targets. The time required may be dependent on factors such as the relative ratio of functionalized nanoparticles and NMPs 2 in the environment 4. For example, less-concentrated IONP mixtures (i.e., a lower quantity of magnetic nanoparticles per liter of environment) may increase the time required. Similarly, environments with fewer, widely dispersed NMP targets, or environments with less natural intermixing, will also require additional time.

The surface contact between the adsorbate and adsorbent may result in multiple functionalized nanoparticles binding to a single NMP, or vice versa, so that a bundling or clumping into magnetized agglomerates 8 of nanoparticle: NMP combinations may occur in the environment 4. An external magnetic field 6, such as from a simple permanent bar magnet or other source, may be applied to the environment 4 to further group the agglomerates 8 for removal. The magnetic field 6 separates the agglomerates 8 so they collect at a predetermined place in the environment 4 based on the magnetic force. The agglomerates 8 may be collected at once from the location or in batches and purified.

In wastewater treatment, or other applications where the environment 4 is a controlled tank, the contaminated material may be pretreated through filtration to remove large molecules and biological material. The material may be mixed with functionalized nanoparticles for a period of time. An external magnetic field may be applied to the tank and cladding/shielding may be used to limit the excess field. After mixing until a sufficient equilibrium is reached, the cladding/shielding may be removed so the external ground attracts the bound functionalized nanoparticles and contaminated material to the bottom of the tank and the tank contents purified for collection and/or disposal of the waste.

Iron-containing nanoparticles may be found throughout the world. Iron-based particles, such as IONPs based on iron oxides, occur naturally in the environment as part of sediments, natural water sources, rocks, minerals, volcanic ash, and other formations. Naturally occurring iron-containing nanoparticles may be formed kinetically, for example, as products of weathering and other naturally occurring cyclic processes. Because of this, the chemical behavior and transport of iron-containing nanoparticles through environmental systems has been documented and understood. As a result, engineered iron-containing nanoparticles like those described herein may be added to the natural environment as part of effective ground water treatment. Engineered IONPs may be environmentally friendly and cost effective, making them a feasible option for water remediation and/or the removal of a range of compounds of interest.

In addition to attracting and removing NMPs from aquatic environments, use of the present disclosure for other applications may also be anticipated. For example, magnetized nanoparticles may be utilized to remove salt ions from drinking water, or to isolate specific particles in petroleum, soils, and other environments. Magnetic nanoparticles may also be used to induce localized hypothermia for use in treating patients with tumors and other clinical and biomedical conditions. In further examples, nanoparticles with magnetic properties may be used as additives in industrial catalysts and lubricants, or in agricultural nanopesticides and nanofertilizers. Those of skill in the art will be readily able to recognize and adapt the particles and methods herein to these and other applications.

An example method for using a magnetic nanoparticle material to remove waste from an environment is shown in FIG. 9. Similar to FIG. 7, the example method 900 is illustrated as a collection of blocks in a logical flow graph, which represent a sequence of operations. In some embodiments of the method 900, one or more of the blocks may be manually and/or automatically executed. In addition, the order in which the operations are listed and described is not intended to be construed as a limitation, and any number of the described blocks may be combined in any order and/or in parallel to implement the method.

The example method 900 at 902 may involve administering magnetic iron-containing nanoparticles having a hydrophobic coating to a target environment. In some examples, the nanoparticles may have an amphiphilic or hydrophilic coating instead of, or in addition to, the hydrophobic coating. The coating may be a functional group based on PDMS copolymers or other materials, for example, as described herein. The synthesis of the nanoparticles may give them magnetic properties so that, at 904, the magnetic nanoparticles may attract plastic waste in the environment. In some embodiments, the iron-containing nanoparticles may be, for example, IONPs having wo or more phases, with one of the phases being a ferromagnetic inverse spinel phase of iron oxide.

At 906, the example method 900 may include binding, through adsorption, the waste with the iron oxide nanoparticles to isolate the waste from the remainder of the environment, as described herein. The waste may be, for example, microplastics or NMPs. The surface adsorption between the waste and the nanoparticles may occur at, for example, an outer surface of the hydrophobic, amphiphilic, and/or hydrophilic coating. In other examples, adsorption may occur at the surface of an oxide layer and/or other surfaces. In further examples, organic or synthetic receptor molecules may be incorporated into the functionalized nanoparticles to act as preferential bonding sites for target molecules in the environment.

The magnetic properties of the nanoparticles may be due at least in part to the iron-containing portion of the nanoparticles. The magnetic selectivity and affinity between the nanoparticles and the target molecules may be enhanced by tuning the properties and phases of the nanoparticles as described herein. In some examples, the nanoparticles may be IONPs having a ferromagnetic inverse spinel phase amounting to at least 40% by weight. In other examples, the nanoparticles may be IONPs having a ferromagnetic inverse spinel phase amounting to at least 70% by weight. In further examples, the nanoparticles may exhibit superparamagnetic properties. Other phases, such as wüstite and hematite, may also be present.

The example method 900 at 908 may involve applying an external static magnetic field to attract the waste molecules bound to the magnetic nanoparticles. In some examples, the attraction between the nanoparticles and the waste may clump or bundle groups of particles together, isolating the waste from the rest of the environment for ease of removal. The influence of the external magnetic field may be strong enough to separate, for example, the magnetic nanoparticles from a liquid. With relatively large $M_s$ magnetization values, many magnetic nanoparticles may be removed with a simple bar magnet, although other methods of filtration and/or removal may also be contemplated. In some embodiments, the external magnetic field may be shielded or focused so as to attract the waste and nanoparticles selectively to a particular location or region of the environment.

At 910, the example method 900 may then include collecting the waste bound to the iron-containing nanoparticles from the environment. The external magnetic field may attract for collection both nanoparticles that are bound to target molecules and residual nanoparticles that are not bound to target molecules. In some embodiments, after purifying collected agglomerates of the nanoparticles and waste, the purified nanoparticles may be regenerated and reused. Some or all of the steps of example method 900 may then be repeated if further separation is required or a different type of waste is to be targeted.

Applicant has also conducted experiments using the functionalized IONPs synthesized and characterized herein. The IONPs were produced with, for example, various PDMS-functionalizations as coatings and experiments were carried out to determine the performance of the functionalized IONPs for magnetic adsorption in several aqueous environments. NMPs were simulated using commercial plastic polyethylene and polystyrene nurdles, fibers, and beads in both fresh and artificial saltwater environments. For some of the experiments, local fresh water containing environmental nurdle samples were collected and analyzed, since environmental samples may have different surface properties than new plastic material with pristine surfaces. Additionally, some experiments used fluorescence to tag and label the target NMPs identified for separation and recovery.

Figure 10B:
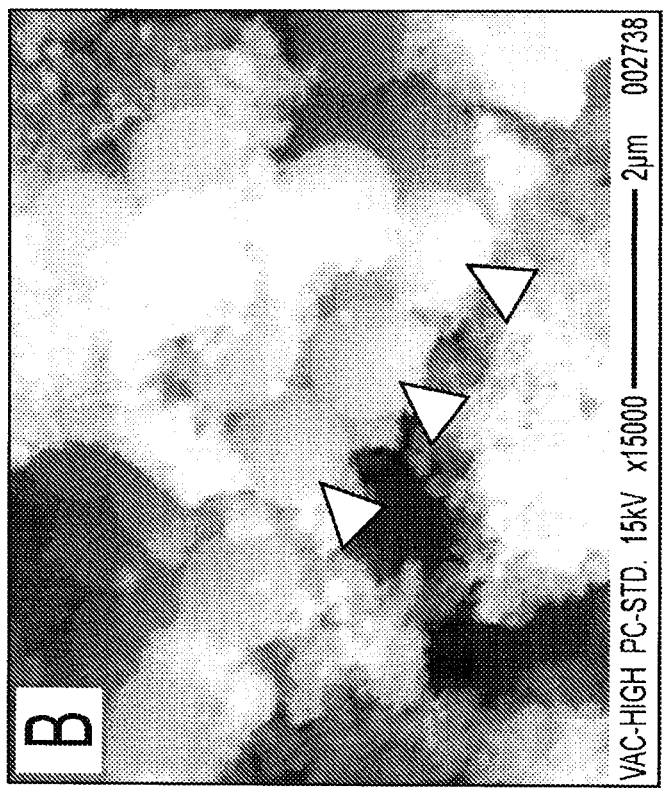
FIG. 10B is an SEM micrograph showing a magnified view of the NMPs and magnetic nanoparticles of FIG. 10A, according to certain embodiments of the disclosure.
Figure 10A:
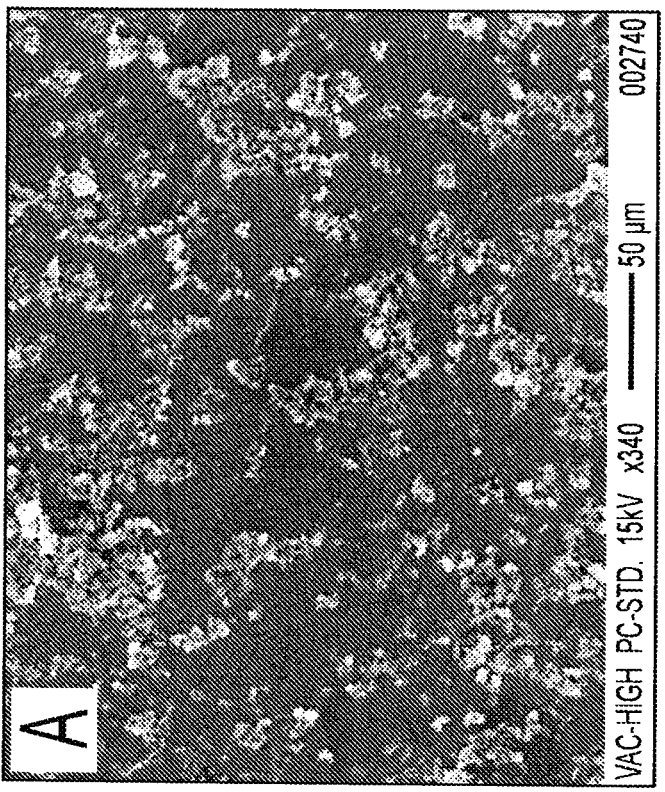
FIG. 10A is an SEM micrograph showing the binding of NMPs by magnetic nanoparticles, according to certain embodiments of the disclosure.

FIG. 10A and FIG. 10B represent example images generated from the experiments after mixtures of functionalized IONPs were added to aqueous environments containing plastic NMPs and incubated at room temperature. The images were taken on a high-vacuum JEOL Neoscope JCM-5000 scanning electron microscope (SEM) at an accelerating voltage of 15 kV. FIG. 10A at 340× magnification shows rapid magnetization of the plastic NMPs in water where precipitation was observed, and agglomerates quickly formed. Very good coverage of the waste, as simulated by the polyethylene nurdles and beads, was achieved by functionalized magnetic IONPs coated with both C-PDMS and PAA:PDMS-co-APMS. FIG. 10B shows binding and agglomeration between IONPs and several NMPs (marked with arrows) at 15 kx magnification. The binding and recovery of the functionalized IONPs with the small polyethylene fibers was verified in both fresh and artificial sea water with the SEM. The SEM images were able to show the interaction between the IONPs and plastic particles of various sizes (i.e., 100, 500, and 1000 nm). It was also noted that other materials present in some of the example aqueous environments, such as sand, bentonite clay, and biologics, were not magnetized and were left undisturbed during the experiments.

To determine the effectiveness of the separation in the experiments, fluorescently labeled NMPs were used as indicators. After binding and recover of the NMPs with the functionalized IONPs, the florescence of the supernatant was measured and compared with an initial value. A highly statistically significant reduction (p<0.0001) in fluorescence was observed, corresponding to an 89.1%, 92.7%, and 89.5% recovery rate of NMPs with particles sizes of 100, 500, and 1000 nm, respectively.

Although simple permanent bar magnets were observed to be sufficient for laboratory and/or limited scale testing, Applicant understands that larger applications for environmental remediation and/or wastewater purification may use a high gradient magnetic separator (HGMS) or similar device due to the large volumes of water which would need to be processed. A multi-stage system may include an electromagnet with selective on/off capabilities, control of the electronic current, and a sonicator to perform the necessary steps of binding, separating, and recycling the collected IONPs and NMPs.

Having now described some illustrative embodiments of the disclosure, it should be apparent to those skilled in the art that the foregoing is merely illustrative and not limiting, having been presented by way of example only. Numerous modifications and other embodiments are within the scope of one of ordinary skill in the art and are contemplated as falling within the scope of the disclosure. Although many of the examples presented herein involve specific combinations of method acts or system elements, it should be understood that those acts and those elements may be combined in other ways to accomplish the same objectives. Those skilled in the art should appreciate that the parameters and configurations described herein are exemplary and that actual parameters and/or configurations will depend on the specific application in which the systems, methods, and/or aspects or techniques of the disclosure are used. Those skilled in the art should also recognize or be able to ascertain, using no more than routine experimentation, equivalents to the specific embodiments of the disclosure. It is, therefore, to be understood that the embodiments described herein are presented by way of example only and that, within the scope of any appended claims and equivalents thereto, the disclosure may be practiced other than as specifically described.

Furthermore, the scope of the present disclosure shall be construed to cover various modifications, combinations, additions, alterations, etc., above and to the above-described embodiments, which shall be within the scope of this disclosure. Accordingly, various features and characteristics as discussed herein may be selectively interchanged and applied to other illustrated and non-illustrated embodiment, and numerous variations, modifications, and additions further may be made thereto without departing from the spirit and scope of the present disclosure as set forth in the appended claims.

What is claimed is:

1. A method for using magnetic nanoparticles to remove waste from an environment, the method comprising:
    Administering iron-containing nanoparticles to the environment, said iron-containing nanoparticles comprising an amphiphilic coating with an aminopropylmethylsiloxane-co-dimethylsiloxane block copolymer;
    Attracting waste in the environment utilizing magnetic properties of the iron-containing nanoparticles;
    Binding, through adsorption, the waste to the iron-containing nanoparticles to isolate the waste from the remainder of the environment; and
    Applying an external static magnetic field to attract the waste bound to the iron-containing nanoparticles.

2. The method of claim 1, wherein the iron-containing nanoparticles comprise one or more hydrophobic coatings, the one or more hydrophobic coatings comprising a functional group based on PDMS.

3. The method of claim 2, wherein the adsorption between the waste and the iron-containing nanoparticles occurs at an outer surface of at least one of the hydrophobic coatings.

* * * * *